[11] 3,602,575

[72] Inventor Charles Gilbert Young
 Storrs, Conn.
[21] Appl. No. 838,678
[22] Filed July 2, 1969
[45] Patented Aug. 31, 1971
[73] Assignee American Optical Corporation
 Southbridge, Mass.

[54] MULTIPLE WAVELENGTH OPTICAL ISOLATOR
 2 Claims, 1 Drawing Fig.
[52] U.S. Cl. ........................................ 350/151,
 350/147
[51] Int. Cl. .......................................... G02f 1/22
[50] Field of Search ............................. 350/147,
 150, 151, 160

[56] References Cited
 UNITED STATES PATENTS
3,245,314 4/1966 Dillon ........................... 350/151
3,318,652 5/1967 Berger .......................... 350/151
3,484,152 12/1969 Robinson ...................... 350/151

*Primary Examiner*—David Schonberg
*Assistant Examiner*—Paul R. Miller
*Attorneys*—William C. Nealon, Noble S. Williams and Robert J. Bird ABSTRACT: A multiple wavelength optical isolator provides isolation for the light characteristic of either a neodymium glass laser, 1.06 $\mu$m., or ruby, 0.6943 $\mu$m. by immersion in either liquid nitrogen or the combination of dry ice and acetone respectively. The isolator includes a piece of silicate glass doped with 58 weight percent of terbium oxide which is subjected to the field of a permanent magnet of approximately 1100 gauss parallel to the path of light in the glass. The thickness of glass in this dimension is approximately 7.7 cm.

PATENTED AUG 31 1971 3,602,575
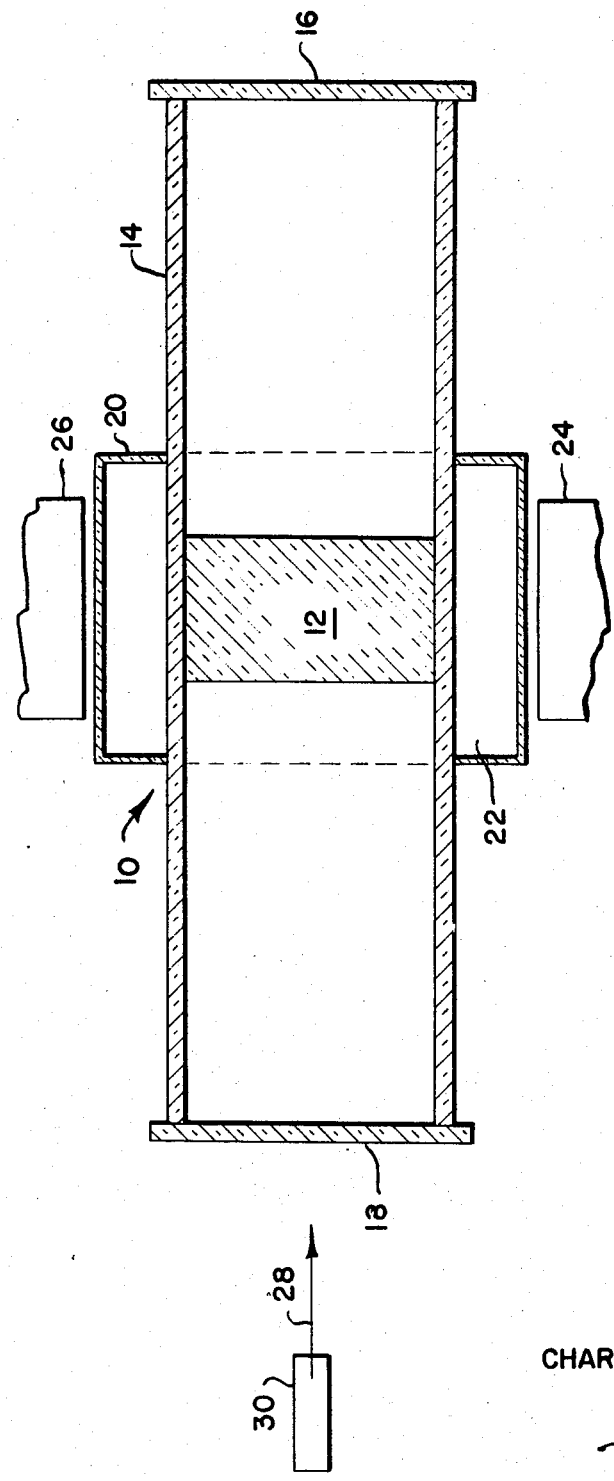
INVENTOR.
CHARLES GILBERT YOUNG
BY Bernard T. Young
AGENT

MULTIPLE WAVELENGTH OPTICAL ISOLATOR

It is well known that when a beam of plain polarized light passes through a plate or ordinary glass which is subjected to a magnetic field with the lines of force of the field in the same direction as the light direction, the plane of polarization of this light is rotated somewhat due to what is commonly called a Faraday magneto-optic effect. Various types of doped silicate glasses have been used as Faraday rotators but they have not functioned as well as might be desired for they have failed to provided as high Verdet constants as may be desired. ($V$=0.071 at 700 m., for example). The silicate glasses heavily doped with lead have high absorption rates for transmitted light and additionally, since they are not paramagnetic, they do not increase their Verdet constant with a decrease in temperature. Metaphosphate glass, containing rare earth metal oxides, is another known Faraday rotator, but these glasses have exhibited only a fair value for Verdet constant. Certain other materials exhibit large Verdet constant values but these have shown to have poor light transmission and cannot, therefore, be used in a thickness sufficient to give a rotation of desired magnitude.

The present invention provides an improvement in Faraday rotation means, which have large Verdet constants for polarized light and at the same time provides good light transmission characteristics for unpolarized light of selected wavelengths within predetermined wavelength regions of the light spectrum so as to be useful in optical systems for allowing or preventing the passage of, or for variously controlling the rotation of, the plane of polarization of polarized light passing therethrough. The improvement provides a Faraday rotation in glass formed of alumina-silicate glass doped with high percentages of terbium, to provide a large Verdet constant with good light transmission at preselected wavelengths, and additionally providing properties with other desired optical and physical properties such as high refractive index with low dispersion, good workability during fabrication, good stability at room temperature, and good resistance to chemical attack and the like. The improvement specifically provides a multiple wavelength optical isolator, whereby with a given permanent magnet a single optical isolator may be useful at two or more of the commonly used laser wavelengths of 1.06 microns and 6,943 angstroms. The glass is cut to predetermined dimensions, and when immersed in a coolant, at a predetermined temperature, a particular predetermined rotation is achieved. For example, a terbium-doped glass having a length of 8.2 cm. under the influence of the field of a permanent magnet immersed in liquid nitrogen provides a rotation of 45° with light of 1.06 microns wavelength, but the same glass and magnet with light of a wavelength of 0.6943 microns and immersed in acetone and dry ice produces a rotation of 51.5°.

It is, therefore, a principal object of the invention to provide a multiple wavelength optical isolator, which produces as a single optical isolator, variable predetermined rotation of polarized light beams at predetermined, easily attainable, temperatures of operation.

Another object of this invention is to provide the required axial magnetic field with a hollow, permanent magnet.

Another object of the invention is to provide a terbium Faraday rotation glass which is useful at two commonly used laser wavelengths without change of magnetic field and without change of the dimensions of the rotation glass.

A further object of the invention is to provide a Faraday rotation glass of predetermined composition and dimension to provide predetermined rotation of various wavelengths of polarized light by immersing the glass in different temperature refrigerants.

These and other objects and advantages of the invention will become apparent from the detailed description given below taken in conjunction with the drawing, the single FIGURE thereof being a schematic showing of one representative embodiment of the present invention.

DETAILED DESCRIPTION

In general, the present invention provides a single optical isolator, generally indicated by reference numeral 10, which includes a terbium-doped silica glass element 12 having 30–70 percent terbium oxide, which is, of course, in the trivalent state of terbium, formed of a predetermined thickness or length through which a particular beam 28 of polarized light passes is subjected to a predetermined magnetic field normally provided by an electromagnet, but in the present case by a permanent magnet, indicated by pole pieces 24 and 26. The glass is immersed in a coolant bath at a predetermined temperature, and a laser light or other polarized or coherent light in a predetermined wavelength range passing through the glass provides a predetermined and variable angle rotation, depending on the temperature of the bath.

The terbium-doped silica glass element 12 is mounted typically in a generally cylindrical enclosure 14 having windows 16 and 18 attached to the ends thereof. The windows 16 and 18 are essentially transparent to light of the wavelengths of interest. A jacket 20 surrounds the enclosure 14 and provides an annular cavity 22 therewith for the containment of the desired refrigerant. A monochromatic beam of light, indicated by arrow 28, from source 30, such as a laser, passes through the window 18, is rotated by the element 12, and exits through the second window 16.

It has been found that the paramagnetic Faraday rotation effect is approximately inversely proportional to the temperature and the terbium ions in the glass produce a rotation which is negative in sign. Further, the Faraday rotation effect almost always increases as the wavelength of the radiation is changed to approach that of the ultraviolet absorption edge. Effective advantage of the Faraday effect is achieved by using light wave radiation which is shorter than the absorption wavelength and directing such radiation through the glass under predetermined temperature conditions. The radiation passing through the glass will be rotated by an angular amount $\theta$, the value of the angle $\theta$ is given by the following equation:

$$\theta = VHL$$

wherein $V$ is the Verdet constant, $H$ is the applied magnetic field, and $L$ is the length of thickness in centimeters of the glass element.

As a specific example, silicate glass doped with 58 weight percent of terbium oxide is formed to a length of 8.2 cm. This piece of glass is immersed in liquid nitrogen and a laser beam of 1.06 microns wavelength is passed through the glass. The 1.06 microns is the wavelength of a neodymium laser. The glass is subjected to a magnetic field from a permanent magnet at a 1100 gauss axial field. At these particular parameters, the rotation of the light is 45°. With the same piece of Faraday rotation glass at the 8.2 cm. length and with the permanent magnet of the 1100 gauss axial field, a laser beam at 0.6943 microns (the wavelengths of ruby laser emission) is rotated 51.5° when the glass is immersed in dry ice and acetone. Since the loss in directivity is proportional to $(\Delta\hat{\theta})^2$ the optical isolation is 25 db. at 1.06 microns and will be at least about 20 db. at 0.6943 microns. Also, by forming the terbium glass to a somewhat lesser thickness, the difference may be split, for example, by forming the glass of a thickness of 7.7 cm. a 25 db. optical isolation may be obtained at either wavelength merely changing the refrigerant.

The extrapolation or interpolation to other wavelengths is easily accomplished as there are a larger number of appropriate refrigerants at various temperatures available. Since the Faraday rotation effect is approximately inversely proportional to the temperature, a single optical isolator may be made which is useful at a plurality of laser or other wavelengths.

I claim:

1. A multiple wavelength optical isolator for use with a source of light, the source being selected from the group consisting of materials providing a monochromatic beam of light having a wavelength of 0.6943 μm. or 1.06 μm., the isolator comprising:
- a piece of high Verdet constant silicate glass doped with from 30 to 70 weight percent of terbium oxide, the thickness of the piece of glass along the beam being in the range of 7.7 to 8.2 cm.,
- a permanent magnet having a field strength of approximately 1100 gauss disposed with its lines of force passing through the piece of glass parallel to the beam, and
- a refrigerant surrounding the piece of glass, the refrigerant being chosen from the group consisting of liquid nitrogen and the combination of dry ice and acetone whereby the first-named refrigerant produces isolation for the monochromatic beam at the wavelength of 1.06 μm. and the second-named refrigerant produces isolation for the monochromatic beam at the wavelength of 0.6943 μm.

2. A multiple wavelength optical isolator according to claim 1, in which the thickness of the piece of glass is 7.7 cm. and the glass is doped with 58 weight percent of terbium oxide.